United States Patent [19]

Grabowski et al.

[11] Patent Number: 5,282,091
[45] Date of Patent: Jan. 25, 1994

[54] MOTOR VEHICLE COURTESY/READING LIGHT LENS WITH DOT PATTERN

[75] Inventors: Gerard Grabowski, Taylor; Robert D. Muller, Royal Oak; Carl G. Czarnecki, Canton, all of Mich.

[73] Assignee: United Technologies Automotive, Inc., Dearborn, Mich.

[21] Appl. No.: 893,485

[22] Filed: Jun. 5, 1992

[51] Int. Cl.⁵ .................................................. G02B 5/00
[52] U.S. Cl. .................................... 359/893; 359/888; 359/599; 362/16; 362/311
[58] Field of Search ............... 359/599, 448, 450, 738, 359/798, 800, 811, 893, 601, 887, 888; 351/44, 45, 46, 233; 362/80, 310, 311, 351, 355, 360, 16; 250/231.1

[56] References Cited

U.S. PATENT DOCUMENTS

| | | |
|---|---|---|
| 1,370,885 | 3/1921 | Frederick et al. |
| 1,399,143 | 12/1921 | Moriarty |
| 1,801,357 | 4/1931 | McElroy |
| 1,850,365 | 3/1932 | Wiegand |
| 2,089,927 | 8/1937 | Stechert ............ 240/41.4 |
| 2,147,914 | 2/1939 | Morehead ............ 88/81 |
| 2,275,602 | 3/1942 | Beck et al. ............ 88/57 |
| 3,514,589 | 5/1970 | Huber ............ 240/46.59 |
| 3,620,600 | 11/1971 | Lindberg ............ 359/619 |
| 4,187,002 | 2/1980 | Roziere ............ 359/888 |
| 4,654,761 | 3/1987 | Walsh ............ 362/80 |
| 4,673,254 | 6/1987 | Kato et al. ............ 359/599 |
| 4,785,385 | 11/1988 | Holst ............ 362/309 |
| 4,928,008 | 5/1990 | Huggins et al. ............ 250/231.1 |
| 5,032,963 | 7/1991 | Granstrom ............ 362/337 |

*Primary Examiner*—Loha Ben
*Attorney, Agent, or Firm*—John Swiatocha

[57] ABSTRACT

A courtesy/reading light lens (24) includes a translucent body (26) having a surface (28) covered with an array of opaque dots (30) for selectively controlling the distribution of lights as it passes through the translucent body (26). The opaque dots (30) are organized in multiple sections (32, 34, 26) that together form a dot pattern. The opaque dots (30) within each section (32, 34, 36) are arrayed at a substantially uniform spacing and have a substantially uniform two-dimensional diameter.

2 Claims, 2 Drawing Sheets

MOTOR VEHICLE COURTESY/READING LIGHT LENS WITH DOT PATTERN

TECHNICAL FIELD

This invention relates to motor vehicle courtesy/reading light lenses and more particularly to a motor vehicle courtesy/reading light lens with a dot pattern for light control.

BACKGROUND ART

Motor vehicle courtesy/reading lights are provided in the interior of motor vehicles in order to supply interior lighting so that the occupants of the motor vehicle can read, consult maps, look for objects, and perform other functions which would be difficult to perform with little or no interior light. A common problem encountered when utilizing courtesy/reading lights is that they illuminate the entire interior of the vehicle and do not control the amount of light each occupant of the vehicle receives. This can be especially dangerous because the light emitted from conventional courtesy/reading lights is often too bright and, therefore, interferes with a driver's ability to safely operate the motor vehicle. There have been several attempts to reduce the light and glare from courtesy/reading lights on the driver while providing enough light for the rest of the occupants.

One conventional means for controlling the amount of light in the interior of a motor vehicle is by installing a courtesy/reading light which is capable of being turned so as to be aimed in a certain direction or area of the motor vehicle. This type of aimed courtesy/reading light often produces a very bright, concentrated ray which i generally too bright in some areas and not bright enough in others. Consequently, the light must be regularly adjusted depending on the function it is being used for. If the light is being continually operated over a period of time the area around it often becomes too hot to touch and hence adjust. This particular light also has a tendency to reflect off certain interior surfaces, such as the dash board, into the line of vision of the driver. Additionally, because the aimed courtesy/reading light comprises multiple parts, some of which are moveable, it is more likely to be subject to mechanical failure than a courtesy/reading light comprising few, nonmoveable parts. The aimed courtesy/reading light also exhibits a greater tendency to rattle, an undesirable quality in the motor vehicle environment where noise levels are traditionally kept to a minimum. An additional drawback of the aimed courtesy/reading light is that it typically costs more to manufacture and install than other courtesy/reading lights which do not require complex assembly techniques and multiple, moveable parts.

Another means presently utilized for controlling the amount of light inside the motor vehicle is by tinting, frosting, or stippling the lens that covers the courtesy/reading light. Typically such treated lenses are able to reduce the glare on the driver, but they also significantly decrease the light in the rest of the motor vehicle. Often the glare on the driver is not sufficiently diminished to allow the motor vehicle to be safely operated with the courtesy/reading light on, of the occupants are not provided with enough light to see by. These lenses do not selectively control the distribution of light in different areas of the interior of the motor vehicle, but instead simply decrease the amount of light in the entire interior. Other attempts to uniformly treat or cover the courtesy/reading light lens have encountered the same difficulty.

Alternatively, although not presently employed as a means for controlling light in motor vehicles, some fluorescent lights utilize an exterior clear plastic cover which is covered with a pattern of dark lines that intersect to act as a dimmer for the fluorescent light. The pattern of dark lines intersect more in some areas of the plastic cover than others, hence the amount of light which passes through these areas is less. By turning the cover to an area with a dense amount of lines the light is dimmed over the entire area. Once again, although this pattern is capable of reducing the glare from a light by dimming the light as it passes through the pattern of intersecting lines, it does this uniformly and does not selectively shade certain areas and not others. Therefore, because this type of light dimming device would not selectively control the amount of light the individual occupants of the motor vehicle receive, it would not be an appropriate solution.

Another possible means to selectively control the distribution of light in the interior of a motor vehicle would be by utilizing a light control film. Light control film comprises extremely narrow, dark or opaque parallel lines printed on a thin, stiff plastic sheet for controlling light distribution in the same manner that venetian blinds control light as it passes through them. By printing the lines so that they are angled at different degrees the light becomes slanted in a certain direction as it passes through the openings between the lines of the light control film. Although acceptable for some applications light control film is not well suited for a motor vehicle environment.

Four very important features of any interior component of a motor vehicle are design flexibility, durability, cost and aesthetic appeal. Light control film is lacking in all of these areas. Design flexibility is important to motor vehicle manufacturers because different models of motor vehicles often require interior components of different size, shape, and color. If an interior component is capable of being easily adapted for a variety of motor vehicles at a minimum cost it is frequently the component of choice. The direction and degree to which the lines on the light control film are angled are predetermined by the manufacturer of the film, therefore, selection of lines at particular angles is limited. Additionally, because the light control film is manufactured on stiff plastic sheet it is not capable of being formed onto a multiple contoured surface. Since the light control film must be purchased from a supplier and then molded to the courtesy/reading light lens it does not allow for design flexibility and is therefore, not well suited for use in a motor vehicle environment.

Because motor vehicles can be on the road for up to 10 years or more, durability is another important feature to consider when choosing a motor vehicle component. Any item which can be easily scratched or nicked is not usually used in or on a motor vehicle. Currently available light control film has a polished surface which is very susceptible to scratching and would, therefore, under normal wear become scratched and nicked, losing its luster and any aesthetic appeal it originally had. Aesthetic appeal is a very important aspect of a motor vehicle's interior because many people spend up to 15 hours per week or more inside of their motor vehicles. Also, aside from being unappealing to look at, a scratched or nicked component may take away from the motor vehicle's resale value. Additionally, because of its susceptibility to scratching the light control film would have to be carefully stored and handled adding additional cost to the product.

Due to the competitive nature of the automotive market cost control is always an important consideration. Currently available light control film is relatively expensive to purchase and because the film is costly to store and handle it is too expensive to be used in most motor vehicle applications, especially as a cover for a courtesy/reading light. For the foregoing reasons light control film is not an acceptable solution to the aforementioned problem of shading the driver of a motor vehicle while proving the passengers with enough light to see by.

Finally, some motor vehicle's utilize multiple courtesy/reading lights in order to direct light to certain areas of the motor vehicle's interior. Although utilizing multiple courtesy/reading lights does enable certain areas of the motor vehicle's interior to receive more light than others, such multiple lights still illuminate the entire interior of the motor vehicle and like other conventional courtesy/reading lights tend to reflect off of certain interior surfaces, such as the dashboard. Therefore, multiple courtesy/reading lights do not control light inside of the motor vehicle well enough to be operated without interfering with the driver's ability to safely operate the motor vehicle.

DISCLOSURE OF THE INVENTION

An object of this invention is to provide a new and improved lens for a motor vehicle courtesy/reading light which selectively shades the light to provide varying degrees of illumination within the interior of a motor vehicle.

Another object is to provide such a lens which is scratch-resistant and aesthetically pleasing so as to complement the surrounding interior of the motor vehicle.

A further objective is to provide such a lens which can be molded into different shapes, sizes, and colors at a low cost.

According to the present invention, a motor vehicle courtesy/reading light lens includes a surface comprising multiple sections of solid, opaque dots, each section having dots of two dimensional uniform diameter and spacing.

The motor vehicle courtesy/reading light lens is a reliable and inexpensive means for selectively controlling the amount of light the individual occupants of the motor vehicle receive, thereby promoting safe operation of the motor vehicle. The lens is easily manufactured, durable, and can be used in any type of motor vehicle which utilizes a courtesy/reading light with a lens.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
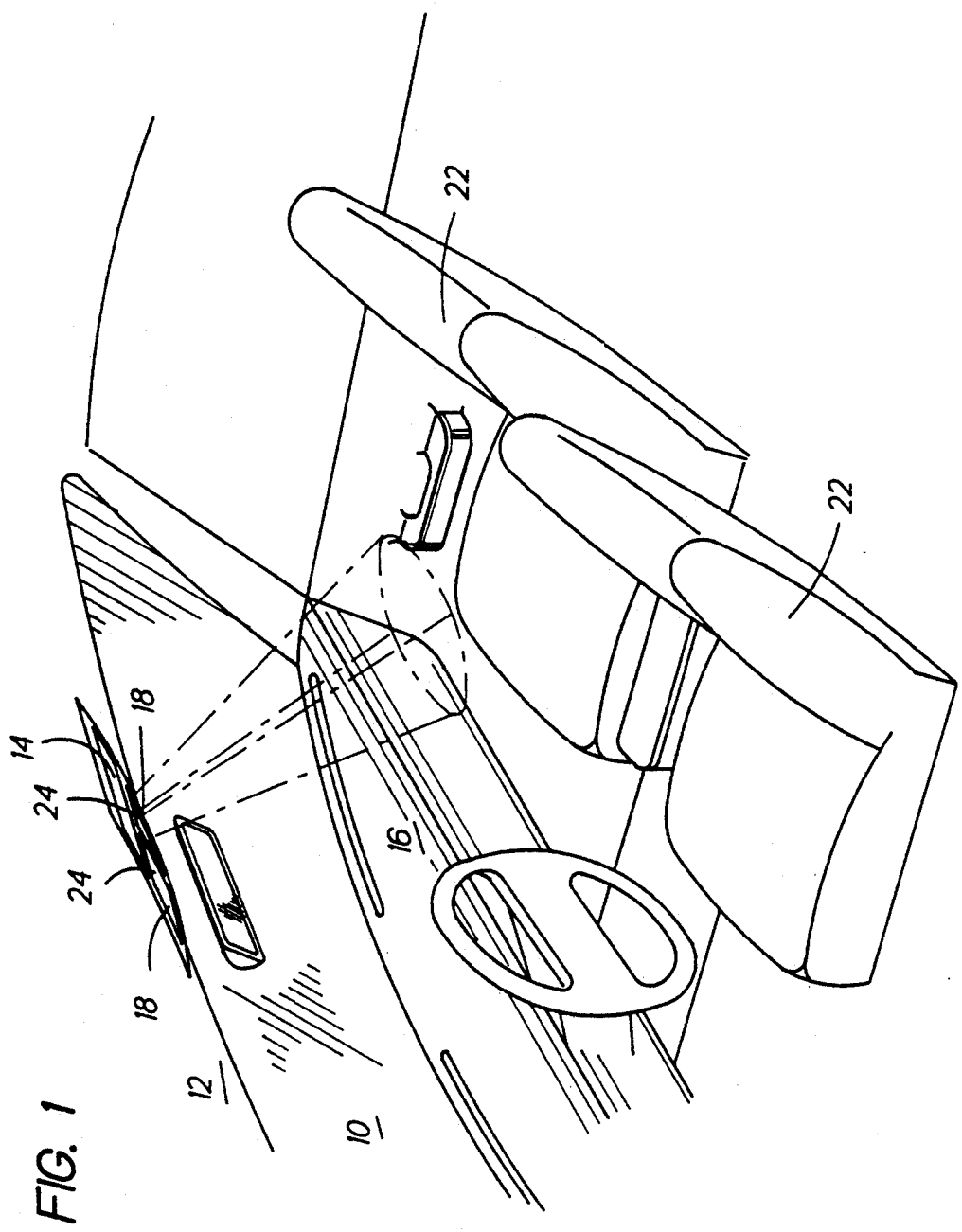
FIG. 1 is a perspective illustrating an interior of a motor vehicle.

Referring now to FIG. 1, the interior of a typical motor vehicle is shown having a windshield 10, a cloth headliner 1 overhead console 14, a dashboard 16, and two courtesy/reading lights 18. The driver's seat 20 and a passenger's seat 22 are also depicted. In accordance with the present invention each courtesy/reading light 18 employs a lens 24 with a dot pattern for controlling the amount of light each occupant of the motor vehicle receives.

Figure 2:
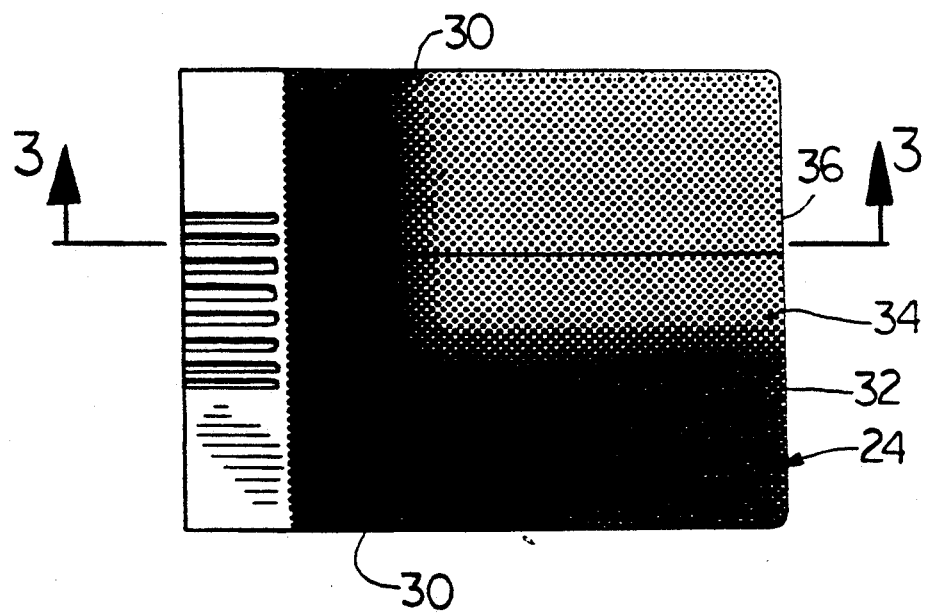
FIG. 2 is a plan view of a motor vehicle courtesy/-reading light lens of the present invention.
Figure 3:
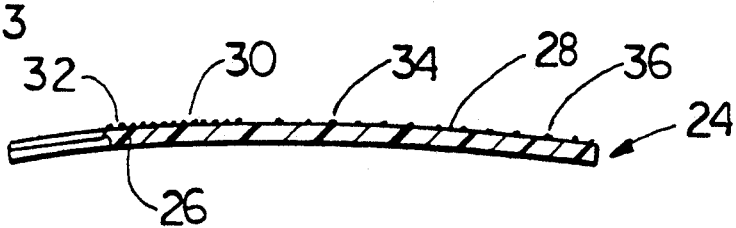
FIG. 3 is a side view taken in the direction of line 3—3 of FIG. 2.

Referring now to FIGS. 2-3, the courtesy/reading light lens 24 comprises a translucent body 26 having a surface 28 covered with an array of opaque dots 30 organized in multiple sections 32, 34, 36 that form the dot pattern. The multiple sections 32, 34, 36 each comprises a plurality of opaque dots 30 arrayed at a substantially uniform spacing and having a substantially uniform two dimensional diameter. One section of dots disposed on the surface 28 of the courtesy light lens 24 comprises large diameter dots 32 whose spacing between dots is relatively small in order to selectively shade certain portions of the interior of the motor vehicle from unwanted bright light. The large diameter dots 32 may be selectively positioned anywhere on the surface 28 of the courtesy/reading light lens 24 as long as they are positioned to selectively shade the interior of the motor vehicle. This design flexibility allows the courtesy/reading light lens 24 to be quickly, cheaply, and easily adapted for use in a variety of motor vehicles, regardless of the shape or size of the lens 24 required. In the preferred embodiment the large diameter dots 32 form an L-shaped pattern in order to shade the driver and to prevent light from reflecting off of other interior components, such as the dashboard 16, into the line of vision of the driver.

Small diameter dots 36 which are spaced further apart than the other sections 32, 34 of opaque dots 30 are selectively arrayed on the surface 28 of the courtesy/reading light lens 24 to provide the occupants of the motor vehicle with enough light so that they may read, consult maps, look for objects, and perform other functions which would be difficult to accomplish with little or no interior light. As with the large diameter dots 32, the small diameter dots 36 may be arrayed anywhere on the surface 28 of the courtesy/reading light lens 24 as long as they are positioned so as to provide enough light for the occupants to perform the aforementioned activities. The small diameter dots 36 are positioned so as to selectively illuminate the interior of the motor vehicle thereby lighting some of the interior, but not all of it. The small diameter dots 36 also diffuse the light in order to prevent the light from being too strong or glaring thereby providing additional protection for the driver. In the preferred embodiment the small diameter dots 36 comprise most of the surface area of the courtesy/reading light lens 24 not covered by the section of large diameter dots 32. The portion of the surface 28 that remains is disposed between the section of large diameter dots 32 and the section of small diameter dots 36. The remaining portion of the surface 28 comprises transitional dots 34 whose diameters are smaller than the large diameter dots 32 but larger than the small diameter dots 36. These transitional dots 34 spacing is also relative to the other sections 32, 36 of opaque dots 30 spacing. The transitional dots 34 provide a smooth progression from the large diameter dots 32 to the small diameter dots 36 in an aesthetically appealing way that allows an intermediate amount of light to pass through the courtesy/reading light lens 24.

The multiple sections 32, 34, 36 of opaque dots 30 are heat treated onto the surface 28 of the courtesy/reading light lens 24. Heat treating permanently affixes the dots 30 to the lens 24 so that they will not peel or chip off of the courtesy/reading light lens 24 over time. By covering the surface 28 of the courtesy/reading light lens 24 with opaque dots 30 the lens 24 also becomes scratch resistant which is an important characteristic in motor vehicle components since scratched components are unappealing and can reduce the resale value of the motor vehicle. The courtesy/reading light lens 24 is aesthetically appealing not only because of its resistance to peeling, chipping, and scratching but also because it utilizes opaque dots 30 which blend well with the texture of interior components of the motor vehicle which are often made of stippled plastic or cloth. By utilizing an array of opaque dots 30 which smoothly progresses from large diameter dots 32 to smaller diameter dots 36 the courtesy/reading light lens 24 approximates the appearance of a weave, much like the cloth weave utilized in most motor vehicle headliners 12. Because the opaque dots 30 approximate the appearance of a cloth weave, the courtesy/reading light lens 24 blends well with other interior cloth components of the motor vehicle as well. The opaque dots 30 may also be any color so as to compliment the interior color scheme of the motor vehicle.

The courtesy/reading light lens, unlike prior art lenses, selectively provides varying degrees of lighting within the motor vehicle in an inexpensive, aesthetically pleasing, scratch resistant, easily manufactured lens which can be readily adapted to any motor vehicle's courtesy/reading light.

Although the invention has been shown and described with respect to exemplary embodiments thereof, it should be understood by those skilled in the art that various changes, omissions, and additions may be made therein and thereto, without departing from the spirit and the scope of the invention.

Having thus described the invention, what is claimed is:

1. A lens for a light comprising:
   a translucent body having a surface covered with a plurality of opaque dots organized in multiple sections, said opaque dots within each of said sections being arrayed at a substantially uniform spacing and having a substantially uniform diameter, and said opaque dots being selectively arrayed from section to section such that an amount of light passing through the lens varies from one section to the next.

2. A lens for a courtesy/reading light of the type used in vehicles for providing light to an occupant in the interior of the vehicle, said lens comprising: a translucent body having a surface covered with a plurality of opaque dots organized in multiple sections, the opaque dots within each of said sections being arrayed at a substantially uniform spacing and having a substantially uniform diameter, and said opaque dots being selectively arrayed from section to section for selectively directing said light to certain portions of the interior of the motor vehicle while selectively shading other portions of the motor vehicle's interior.

* * * * *